(12) United States Patent
Takahashi et al.

(10) Patent No.: US 10,664,204 B2
(45) Date of Patent: May 26, 2020

(54) PRINTING APPARATUS AND NON-TRANSITORY COMPUTER READABLE MEDIUM STORING PROGRAM WITH PERIODIC PRINTING EXECUTION

(71) Applicant: FUJI XEROX CO., LTD., Tokyo (JP)

(72) Inventors: Daichi Takahashi, Kanagawa (JP); Noriyuki Suzumura, Kanagawa (JP); Shinichi Takano, Kanagawa (JP); Chiemi Miyata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/802,418

(22) Filed: Nov. 2, 2017

(65) Prior Publication Data
US 2018/0203646 A1    Jul. 19, 2018

(30) Foreign Application Priority Data

Jan. 18, 2017    (JP) .................................. 2017-007081

(51) Int. Cl.
*G06F 3/12*    (2006.01)

(52) U.S. Cl.
CPC .......... *G06F 3/1205* (2013.01); *G06F 3/1253* (2013.01); *G06F 3/1273* (2013.01); *G06F 3/1285* (2013.01)

(58) Field of Classification Search
CPC .... G06F 3/1205; G06F 3/1273; G06F 3/1253; G06F 3/1257; G06F 3/1285; H04N 2201/3214; H04N 2201/3274
See application file for complete search history.

(56) References Cited

U.S. PATENT DOCUMENTS

| | | | | |
|---|---|---|---|---|
| 10,104,261 | B2* | 10/2018 | Miyata | ............... H04N 1/00954 |
| 2004/0064585 | A1* | 4/2004 | Doss | ............. G06Q 10/063116 |
| | | | | 709/246 |
| 2012/0062938 | A1* | 3/2012 | Tajima | .................. G06F 3/1204 |
| | | | | 358/1.15 |
| 2014/0211256 | A1* | 7/2014 | Hosotsubo | ............ G06F 3/1219 |
| | | | | 358/1.15 |
| 2018/0139343 | A1* | 5/2018 | Igawa | ................ H04N 1/00973 |

FOREIGN PATENT DOCUMENTS

JP    2007034534    2/2007

* cited by examiner

*Primary Examiner* — Kent Yip
(74) *Attorney, Agent, or Firm* — JCIPRNET (57) ABSTRACT

A printing apparatus includes a memory that stores time information having a periodicity and print setting information as a printing execution history, a reception unit that receives print data, and a printer that prints the print data according to the print setting information corresponding to the time information in a case of reception of the received print data or in a case where, if a case of printing execution is designated with respect to the received print data, time in the case of execution corresponds to the time information.

16 Claims, 8 Drawing Sheets

| No. | PAPER TRAY | PRINTING ORIENTATION | DOUBLE-SIDED SETTING | SCALING | PAPER SIZE OF MANUAL INSERTION TRAY | DAY | HOUR |
|---|---|---|---|---|---|---|---|
| 1 | TRAY 1 | PORTRAIT | SINGLE-SIDED | NONE | – | MONDAY | 8:00 |
| 2 | TRAY 3 | PORTRAIT | DOUBLE-SIDED | A4 × 2 | – | MONDAY | 8:02 |
| 3 | MANUAL INSERTION TRAY | LANDSCAPE | SINGLE-SIDED | A3 → A4 | A4 | MONDAY | 8:05 |
| 4 | MANUAL INSERTION TRAY | LANDSCAPE | SINGLE-SIDED | A3 → A4 | A4 | MONDAY | 8:06 |
| 5 | TRAY 1 | PORTRAIT | SINGLE-SIDED | NONE | – | MONDAY | 8:03 |
| 6 | TRAY 3 | PORTRAIT | DOUBLE-SIDED | A4 × 2 | – | MONDAY | 8:05 |
| 7 | MANUAL INSERTION TRAY | LANDSCAPE | SINGLE-SIDED | A3 → A4 | A4 | MONDAY | 8:08 |
| 8 | MANUAL INSERTION TRAY | LANDSCAPE | SINGLE-SIDED | A3 → A4 | A4 | MONDAY | 8:09 |
| 9 | TRAY 1 | PORTRAIT | SINGLE-SIDED | NONE | – | MONDAY | 8:01 |
| 10 | TRAY 3 | PORTRAIT | DOUBLE-SIDED | A4 × 2 | – | MONDAY | 8:03 |
| 11 | MANUAL INSERTION TRAY | LANDSCAPE | SINGLE-SIDED | A3 → A4 | A4 | MONDAY | 8:06 |
| 12 | MANUAL INSERTION TRAY | LANDSCAPE | SINGLE-SIDED | A3 → A4 | A4 | MONDAY | 8:07 |

| No. | PAPER TRAY | PRINTING ORIENTATION | DOUBLE-SIDED SETTING | SCALING | PAPER SIZE OF MANUAL INSERTION TRAY | DAY | TIME SLOT | NUMBER OF EXECUTIONS |
|---|---|---|---|---|---|---|---|---|
| 1 | TRAY 1 | PORTRAIT | SINGLE-SIDED | NONE | — | | | |
|  | TRAY 3 | PORTRAIT | DOUBLE-SIDED | A4 × 2 | — | | | |
|  | MANUAL INSERTION TRAY | LANDSCAPE | SINGLE-SIDED | A3 → A4 | A4 | MONDAY | 8:00 TO 10:00 | 3 |
|  | MANUAL INSERTION TRAY | LANDSCAPE | SINGLE-SIDED | A3 → A4 | A4 | | | |
| 2 | TRAY 2 | PORTRAIT | SINGLE-SIDED | NULL | — | | | |
|  | MANUAL INSERTION TRAY | PORTRAIT | SINGLE-SIDED | NULL | A3 | | | |
|  | TRAY 3 | PORTRAIT | SINGLE-SIDED | A4 × 2 | — | MONDAY | 10:00 TO 12:00 | 3 |
|  | MANUAL INSERTION TRAY | LANDSCAPE | SINGLE-SIDED | A3 → A4 | A4 | | | |

PRINTING APPARATUS AND NON-TRANSITORY COMPUTER READABLE MEDIUM STORING PROGRAM WITH PERIODIC PRINTING EXECUTION

CROSS-REFERENCE TO RELATED APPLICATIONS

This application is based on and claims priority under 35 USC 119 from Japanese Patent Application No. 2017-007081 filed Jan. 18, 2017.

BACKGROUND

Technical Field

The present invention relates to a printing apparatus and a non-transitory computer readable medium storing a program.

SUMMARY

According to an aspect of the invention, there is provided a printing apparatus including: a memory that stores time information having a periodicity and print setting information as a printing execution history; a reception unit that receives print data; and a printer that prints the print data according to the print setting information corresponding to the time information in a case of reception of the received print data or in a case where, if a case of printing execution is designated with respect to the received print data, time in the case of execution corresponds to the time information.

BRIEF DESCRIPTION OF THE DRAWINGS

Exemplary embodiment(s) of the present invention will be described in detail based on the following figures, wherein.

DETAILED DESCRIPTION

Hereinafter, an embodiment of the invention will be described with reference to the accompanying drawings. Meanwhile, the same reference numerals are attached to components which have substantially the same function in the drawings, and description thereof will not be repeated.

Overview of Exemplary Embodiment

A printing apparatus according to an exemplary embodiment includes: a memory that stores time information having a periodicity and print setting information as a history (printing execution history) in which printing is executed; a reception unit that receives print data; and a printer that prints the print data according to the print setting information corresponding to the time information in a case of reception of the received print data or in a case where, if a case of printing execution is designated with respect to the received print data, time in the case of execution corresponds to the time information.

The memory may store time in a case of printing execution, and the print setting information as history information, and may store the time information having the periodicity and the print setting information, which are extracted from the history information by the extraction unit, as extraction information.

The print data received by the reception unit includes print data which involves the print setting information and printer data which does not involve the print setting information. The printer data which does not involve the print setting information includes, for example, text data, such as report data, a Comma Separated Values (CSV) file, and the like. The CSV file is data acquired by delimiting changing item data, such as an address and a name, which are inserted into fields defined on a template, by delimiter characters such as commas. Although the CSV file may be transmitted together with a template, the memory of the printing apparatus may store the template as the print setting information. In addition, there is a case where the case of printing execution is designated with respect to the print data in the print data received by the reception unit.

The print setting information indicates information relevant to print setting, such as designation of a tray (a recording paper size, a paper orientation, a paper quality, and the like are specified) to be used, an expanded or reduced size, monochrome or color printing, and single-sided or double-sided printing, and may include the template.

In a case where, the print data received by the reception unit does not involve the print setting information, the printer prints the print data according to the print setting information which is stored together with the time information having the periodicity.

The time information having the periodicity is information of time which periodically arrives. The time information having the periodicity may be acquired through conversion performed on a unit of time of the history information. For example, an hour of the history information may be converted into a time slot, and a date of the history information may be converted into a day. In addition, a year, a month, a date, and an hour of the history information may be converted into a day and a time slot, a week and a time slot, or a month and a time slot.

The time slot indicates a prescribed time between hours in one date. The time slot may be a time slot between arbitrary hours, may be a time slot between the morning and the afternoon, or may be working time (for example, 8:00-18:00) of the printing apparatus. In addition, two or more types of time slots may be combined. The combination of two or more types of time slots may be, for example, a time slot (for example, 8:00-12:00 as a time slot in which the morning overlaps the working time) in which the morning or the afternoon overlaps the working time of the printing apparatus.

Exemplary Embodiment

Figure 1:
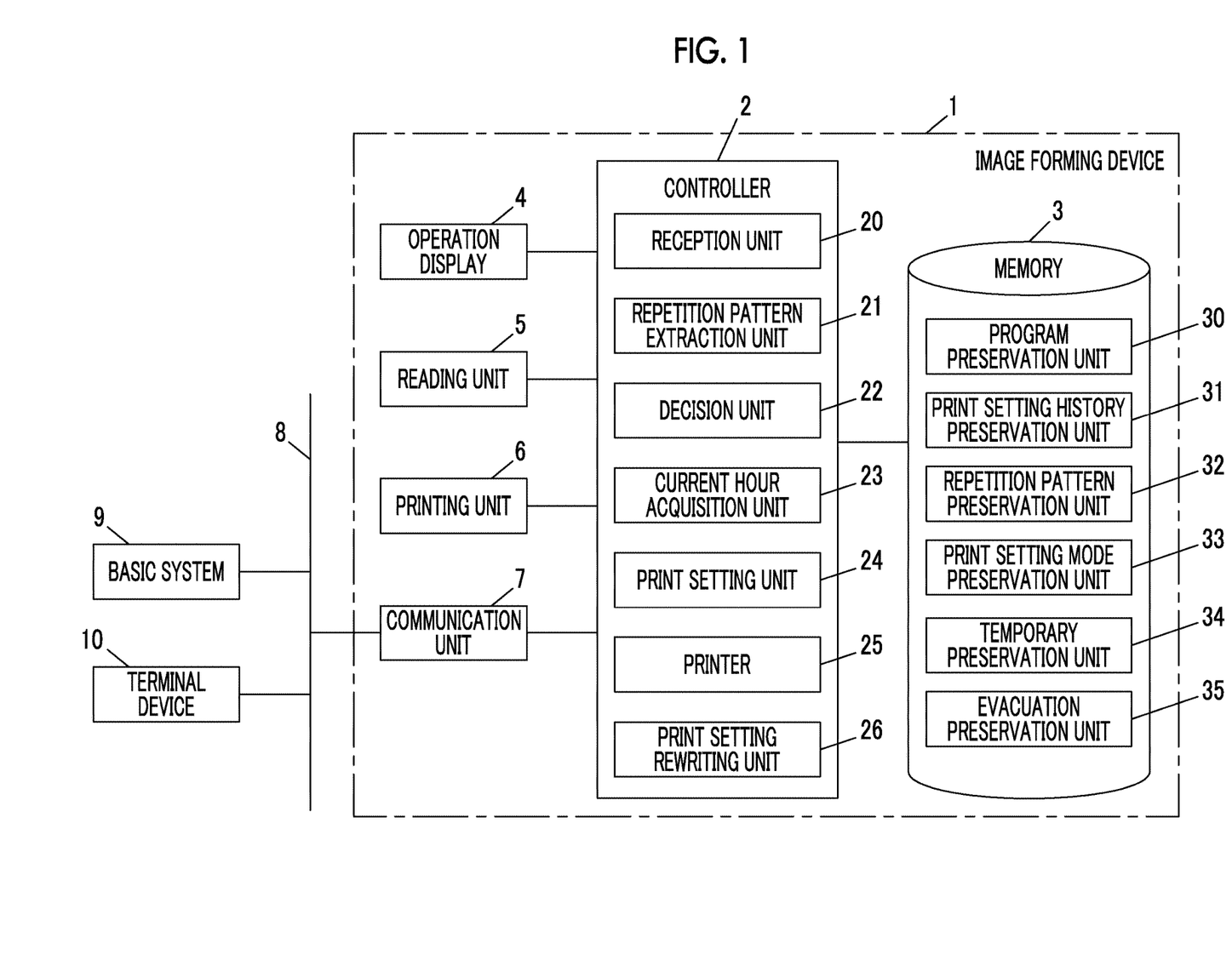
FIG. 1 is a block diagram illustrating a control system of an image forming device according to an exemplary embodiment of the present invention.

FIG. 1 is a block diagram illustrating an example of a configuration of an image forming device according to an exemplary embodiment of the present invention. The exemplary embodiment illustrates an example in which the time information having the periodicity as the printing execution history is a combination of the time slot and the day.

The image forming device 1 is, for example, a multi-function machine which includes plural functions, such as scanning, printing, and copying. The image forming device 1 includes a controller 2 that controls respective units of the image forming device 1, a memory 3 that stores various pieces of information, an operation display 4 that receives an operation from a user and displays information, a reading unit 5 that reads an image from a document, a printing unit 6 that prints the print data on paper, and a communication unit 7 that communicates with an external device. Meanwhile, in the case where the printing apparatus has a function as a printer, the printing apparatus may not be a multi-function machine. The image forming device 1 is an example of the printing apparatus.

A basic system 9 and a terminal device 10 as the external devices are connected to the image forming device 1 through a network 8. The image forming device 1 prints the print data, which are transmitted from the basic system 9 or the terminal device 10 through the network 8, on the paper.

The network 8 includes, for example, a Local Area Network (LAN), the Internet, and the like, and may be wired or wireless.

The basic system 9 sequentially transmits the print data, which does not involve the print setting information, to the image forming device 1 through the network 8, for example, at an arbitrary time slot of an arbitrary day according to a print schedule. The print schedule and the print setting information are normally determined between a print data transmission side and a print data reception side.

Although the terminal device 10 is, for example, personal computer, the terminal device 10 may be a portable information processing apparatus such as a multi-function mobile phone (smart phone). The terminal device 10 includes a printer driver, and transmits the print setting information and the print data, which are set in the printer driver by an operation of the user, 8 as a print job (print instruction) to the image forming device 1 through the network. The print job is an example of the print data which involves the print setting information.

The printer driver converts document data into the print data, which is described in Page Description Language (PDL), such as a Portable Document Format (PDF) or a PostScript (registered trademark), that can be interpreted by the printing unit 6 of the image forming device 1, generates a print job which includes the print data and the print setting information, and transmits the print job to the image forming device 1 through the network 8.

The controller 2 of the image forming device 1 includes a Central Processing Unit (CPU), an interface, and the like. The controller 2 operates according to a program which is preserved in the program preservation unit 30, and functions as a reception unit 20, a repetition pattern extraction unit 21, a decision unit 22, a current hour acquisition unit 23, a print setting unit 24, a printer 25, a print setting rewriting unit 26, and the like. The respective units 20 to 26 will be described later in detail.

The memory 3 includes a Read Only Memory (ROM), a Random Access Memory (RAM), a hard disk, and the like, and includes a program preservation unit 30 that stores the program, a print setting history preservation unit 31 that preserves a print setting history table 310 (see FIG. 2), a repetition pattern preservation unit 32 that preserves a repetition pattern table 320 (see FIG. 4), a print setting mode preservation unit 33 that preserves a print setting mode, a temporary preservation unit 34 that temporarily preserves the print setting information in advance to printing, and an evacuation preservation unit 35 that preserves information desired to be evacuated. The temporary preservation unit 34 is an example of a temporary memory.

The temporary preservation unit 34 preserves the print setting information, for example, from immediately before the start of printing to the end of the printing of the print data.

Figure 2:
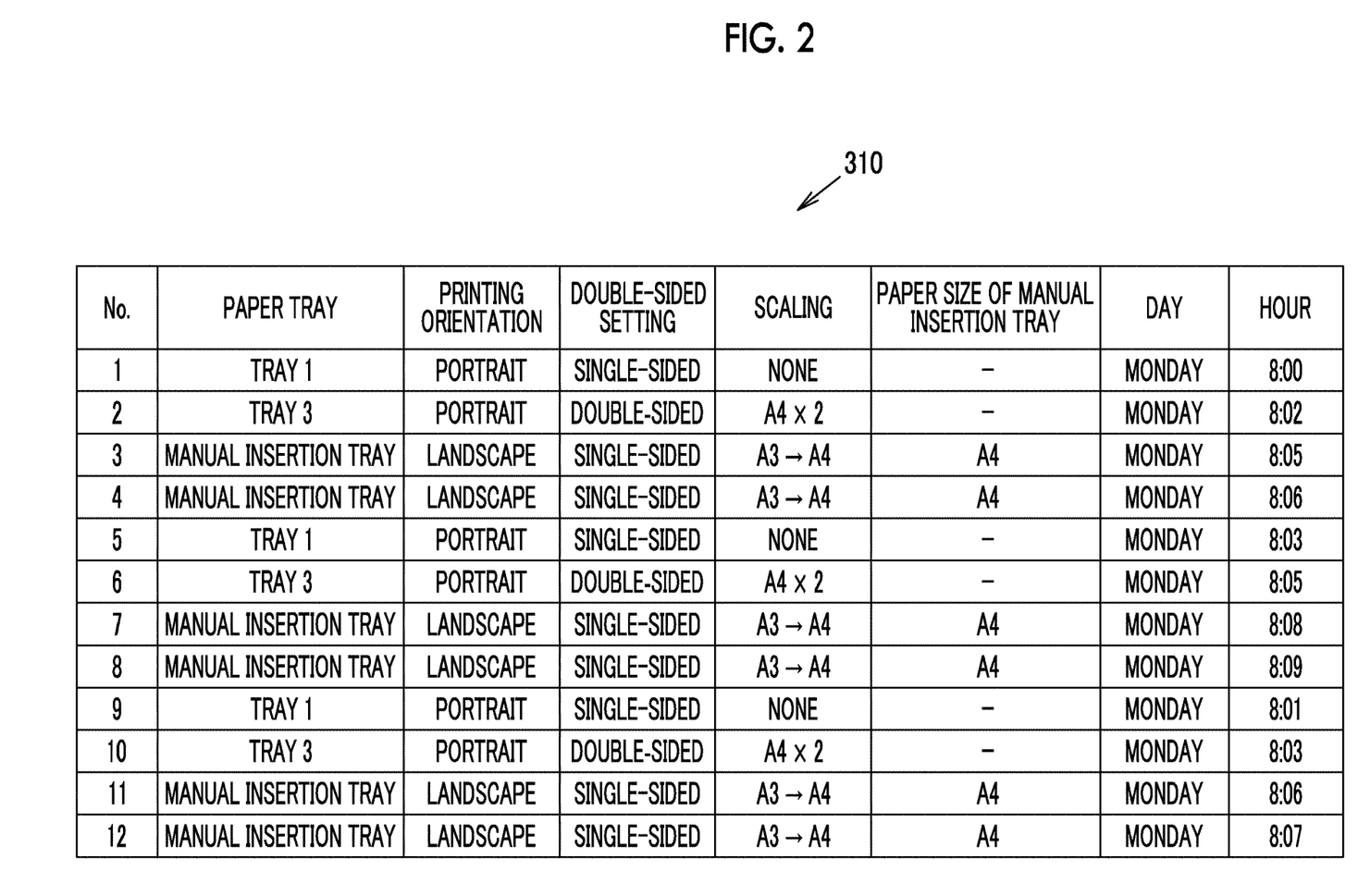
FIG. 2 is a diagram illustrating an example of a print setting history table.

In the print setting history table 310, the print setting information is registered together with time, which indicates the case of printing execution, with respect to the print data which does not involve the print setting information. The print setting history table 310 is an example of the history information.

Figure 4:
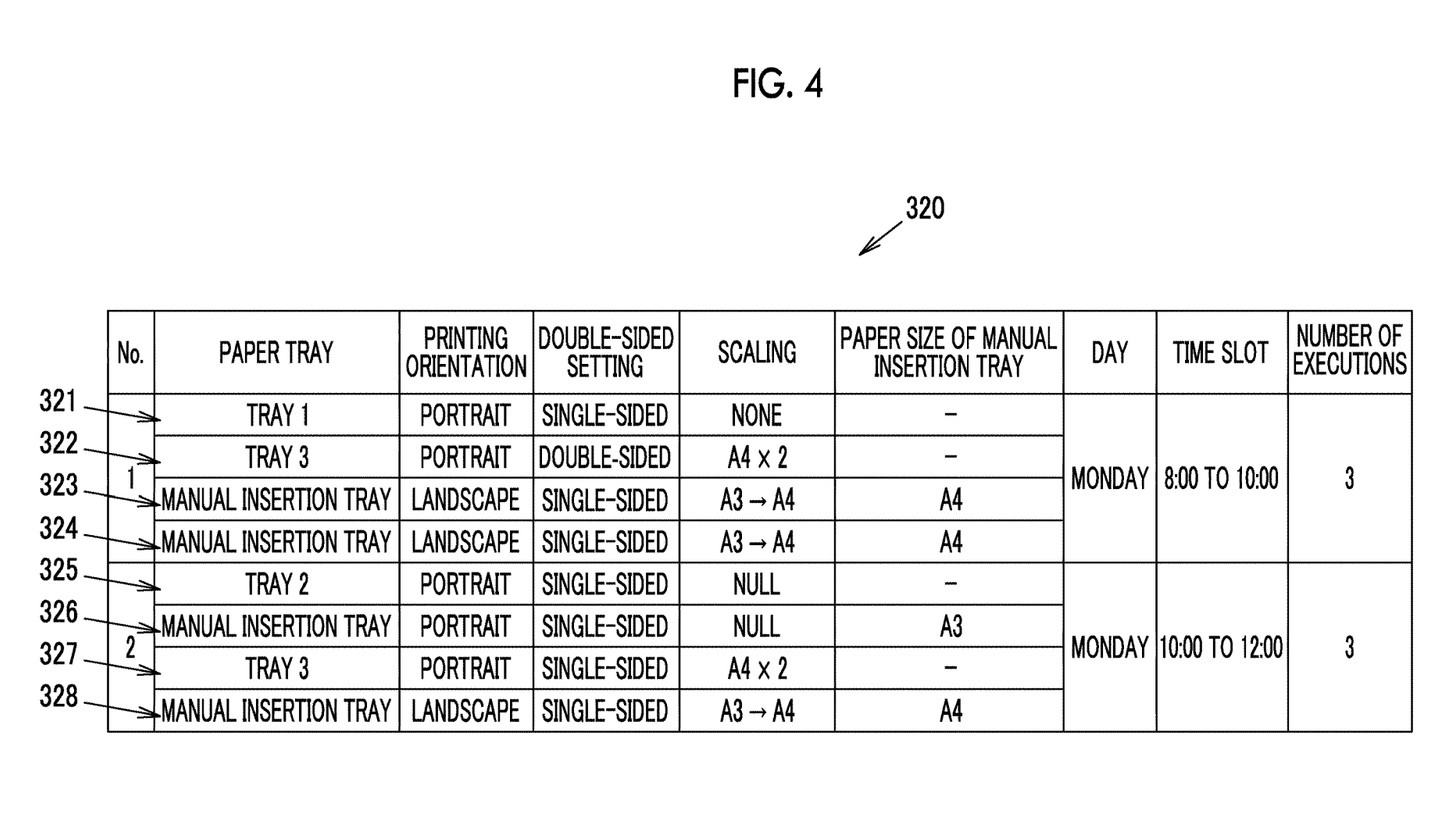
FIG. 4 is a diagram illustrating an example of a repetition pattern table.

In the repetition pattern table 320, the time information having the periodicity and the print setting information, which are extracted from the print setting history table 310, are registered. The repetition pattern table 320 is an example of the extraction information.

The reception unit 20 receives the print data which is transmitted from the basic system 9 through the network 8 or the print job which is transmitted from the terminal device 10 through the network 8.

The repetition pattern extraction unit 21 extracts a print setting repetition pattern from the print setting history information registered in the print setting history table 310. The "repetition pattern" indicates print setting in which, for example, a print setting information group (hereinafter, referred to as "print setting pattern") illustrated in No. 1 to 4 of FIG. 2 which will be described later is repeatedly executed with the same print setting pattern at the same time slot on the same day as expressed in No. 5 to 8 and No. 9 to 12. Specifically, the repetition pattern extraction unit 21 performs conversion on a unit of time of the print setting history table 310, and extracts the print setting information, which is repeated with periodical time information, from the print setting history table 310. In the exemplary embodiment, the hour is converted into the time slot, and the periodical time information is set to a day and a time slot. Accordingly, the repetition pattern extraction unit 21 extracts a pattern, which has coinciding days and time slots and the same print setting information, as the repetition pattern from the print setting history table 310. The time slot may include, for example, 8:00-10:00, 10:00-12:00, 12:00-14:00, 14:00-16:00, and 16:00-18:00 which are acquired by dividing the working time (for example, 8:00 to 18:00) of the image forming device 1 into five.

The decision unit 22 decides whether the print data which is received by the reception unit 20 is transmitted from the basic system 9 or transmitted from the terminal device 10. Specifically, the decision unit 22 decides whether the print data which is received by the reception unit 20 is transmitted from the basic system 9 by deciding whether or not, for example, the print data which is received by the reception unit 20 involves the print setting information.

Meanwhile, in a case where a communication protocol between the image forming device 1 and the basic system 9 is different from a communication protocol between the image forming device 1 and the terminal device 10, the decision unit 22 may decide whether or not data transmitted from the basic system 9 according to a communication protocol specified by the communication unit 7 or the like. Otherwise, for example, the communication unit 7 may decide a file format of the data received by the communication unit 7, and may decide whether or not the data is transmitted from the basic system 9.

The current hour acquisition unit 23 acquires a current hour and day indicative of the present from a timer which is not shown in the drawing and is connected to the controller 2. Meanwhile, the year, the month, the date, and the hour may be acquired.

In a case where the reception unit 20 receives the print data which does not involve the print setting information and time in the case of reception corresponds to the time information (in the exemplary embodiment, the current hour and the day) of the repetition pattern table 320, the print setting unit 24 preserves the print setting information corresponding to the time information (the current hour and the day) in the temporary preservation unit 34. In addition, in a case where the reception unit 20 receives the print job, the print setting unit 24 preserves the print setting information included in the print job in the temporary preservation unit 34. Meanwhile, in a case where the case of printing execution is designated with respect to the print data received by the reception unit 20 and time in the case of printing execution corresponds to the time information of the repetition pattern table 320, the print setting unit 24 may preserve the print setting information corresponding to the time information in the temporary preservation unit 34.

The printer 25 prints the print data, which is included in the print data or the print job received by the reception unit 20, according to the print setting information preserved in the temporary preservation unit 34.

In a case where the reception unit 20 receives the print job, the print setting rewriting unit 26 causes the print setting information preserved in the temporary preservation unit 34 to be evacuated from the evacuation preservation unit 35. After the print job is executed and is printed out, the print setting rewriting unit 26 rewrites storage content of the temporary preservation unit 34 to storage content of the evacuation preservation unit 35, and returns the temporary preservation unit 34 to an original state.

Configuration of Print Setting History Table

FIG. 2 is a diagram illustrating an example of the print setting history table 310. The print setting history table 310 is provided with a "No." field, a "paper tray" field, a "printing orientation" field, a "double-sided setting" field, a "scaling" field, a "manual insertion tray paper size" field, a "day" field, and an "hour" field.

A combination of pieces of content, which are respectively set in the "paper tray" field, the "printing orientation" field, the "double-sided setting" field, the "scaling" field, and the "manual insertion tray paper size" field, is the print setting information.

The "No." field is registered with numbers, such as 1, 2, . . . , are registered as history identification information. The "paper tray" field is registered with paper tray identification information. The "printing orientation" field is registered with a printing orientation including a portrait or a landscape. The portrait indicates an orientation of an image in a case where a long side of the paper is set to a vertical direction, and the landscape indicates an orientation of an image in a case where a short side of the paper is set to the vertical direction. The "double-sided setting" field is registered with "double-sided" which indicates that the print data is printed on double sides of the paper, and "single-sided" which indicates that the print data is printed on a single side of the paper. The "scaling" field is provided with "A4×2" in which two A4-size images are disposed on one piece of paper, "A3→A4" in which A3-size print data is reduced and is printed on A4-size paper, and "none" in which change in scaling is not performed. The "manual insertion tray paper size" field is registered with a paper size (for example, A4) in a case where the manual insertion tray is used. The "day" field and the "hour" field are respectively registered with a day and an hour at which the print setting is performed in the case of printing execution. Meanwhile, the hour, which is registered in the "hour" field, may be an hour in the case of printing execution.

The example of FIG. 2 illustrates an example in which No. 1 to 4 are set to a first month day, No. 5 to 8 are set to second month day, No. 9 to 12 are set to third month day.

FIG. 2 illustrates only an example, and it is possible for the user to arbitrarily designate a condition for extracting the repetition pattern in units of a week, such as a first week and a third week, and in units of a month, in addition to the day and the time slot as illustrated in FIG. 4.

Figure 3:
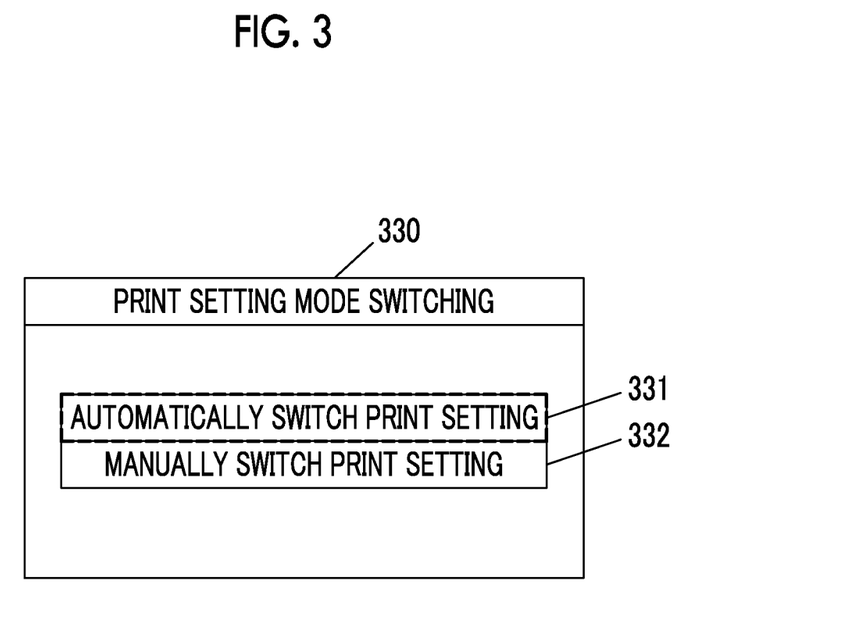
FIG. 3 is a diagram illustrating an example of a print setting mode switching screen displayed by an operation display.

FIG. 3 is a diagram illustrating an example of a print setting mode switching screen displayed by the operation display 4. In a case where the user demands the print setting mode switching screen, the controller 2 displays a print setting mode switching screen 330 on the operation display 4. A print setting mode 331 to "automatically switch print setting" and a print setting mode 332 to "manually switch print setting" are displayed on the print setting mode switching screen 330. In a case where the user touches and selects on any one of the print setting modes 331 and 332, the controller 2 preserves the selected print setting modes 331 and 332 in the print setting mode preservation unit 33. FIG. 3 illustrates a state of the print setting mode 331 in which print setting is automatically switched.

Operation of Exemplary Embodiment

Subsequently, an example of an operation of the image forming device 1 according to the exemplary embodiment will be described with reference to FIGS. 4 to 8.

(1) Extraction of Repetition Pattern from Repetition Pattern Table

Figure 6:
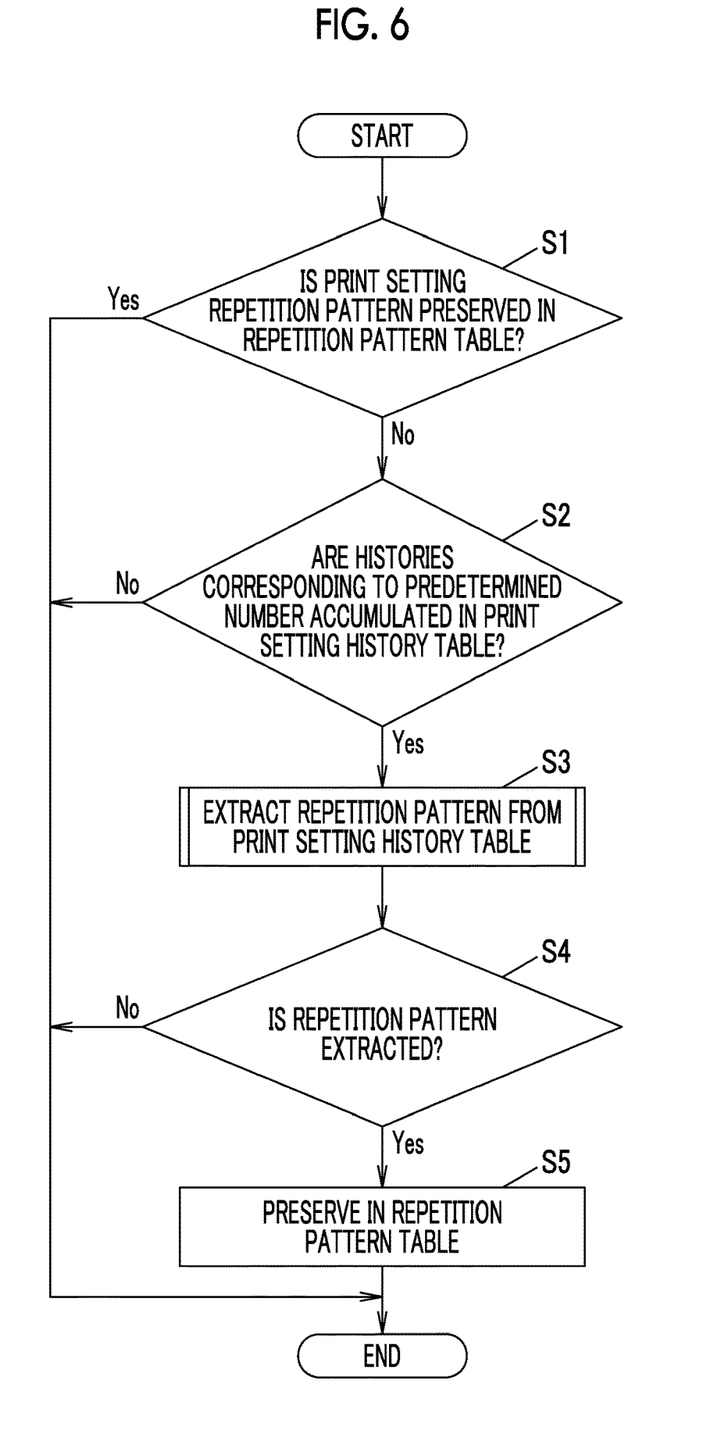
FIG. 6 is a flowchart illustrating an example of an operation of the image forming device in a case where a repetition pattern is extracted from the repetition pattern table.

FIG. 6 is a flowchart illustrating an example of the operation of the image forming device 1 in a case where a repetition pattern is extracted from the repetition pattern table 320.

The repetition pattern extraction unit 21 determines whether or not the repetition pattern is registered with reference to the repetition pattern table 320 which is preserved in the repetition pattern preservation unit 32 (S1). In a case where a print setting repetition pattern is registered (S1: Yes), the repetition pattern extraction unit 21 ends without performing anything.

In a case where the print setting repetition pattern is not registered (S1: No), the repetition pattern extraction unit 21 determines whether or not a prescribed number (for example, 10) of print setting histories are accumulated with reference to the print setting history table 310 preserved in the print setting history preservation unit 31 (S2). In a case where a prescribed number of print setting histories are not accumulated (S2: No), the repetition pattern extraction unit 21 ends the process without performing anything.

In a case where a prescribed number of print setting histories are accumulated (S2: Yes), the repetition pattern extraction unit 21 extracts the print setting repetition pattern from the print setting history table 310 (S3). A process of extracting the repetition pattern from the print setting history table 310 will be described later.

In a case where it is difficult to extract the repetition pattern (S4: No), the process ends without performing anything. In a case where it is possible to extract the repetition pattern (S4: Yes), the repetition pattern extraction unit 21 registers the extracted repetition pattern in the repetition pattern table 320 (S5). In a case where it is difficult to extract the repetition pattern, a case is considered in which histories corresponding to a prescribed number are preserved but the print setting information having the periodicity is not preserved.

(2) Extraction of Repetition Pattern from Print Setting History Table

Figure 7:
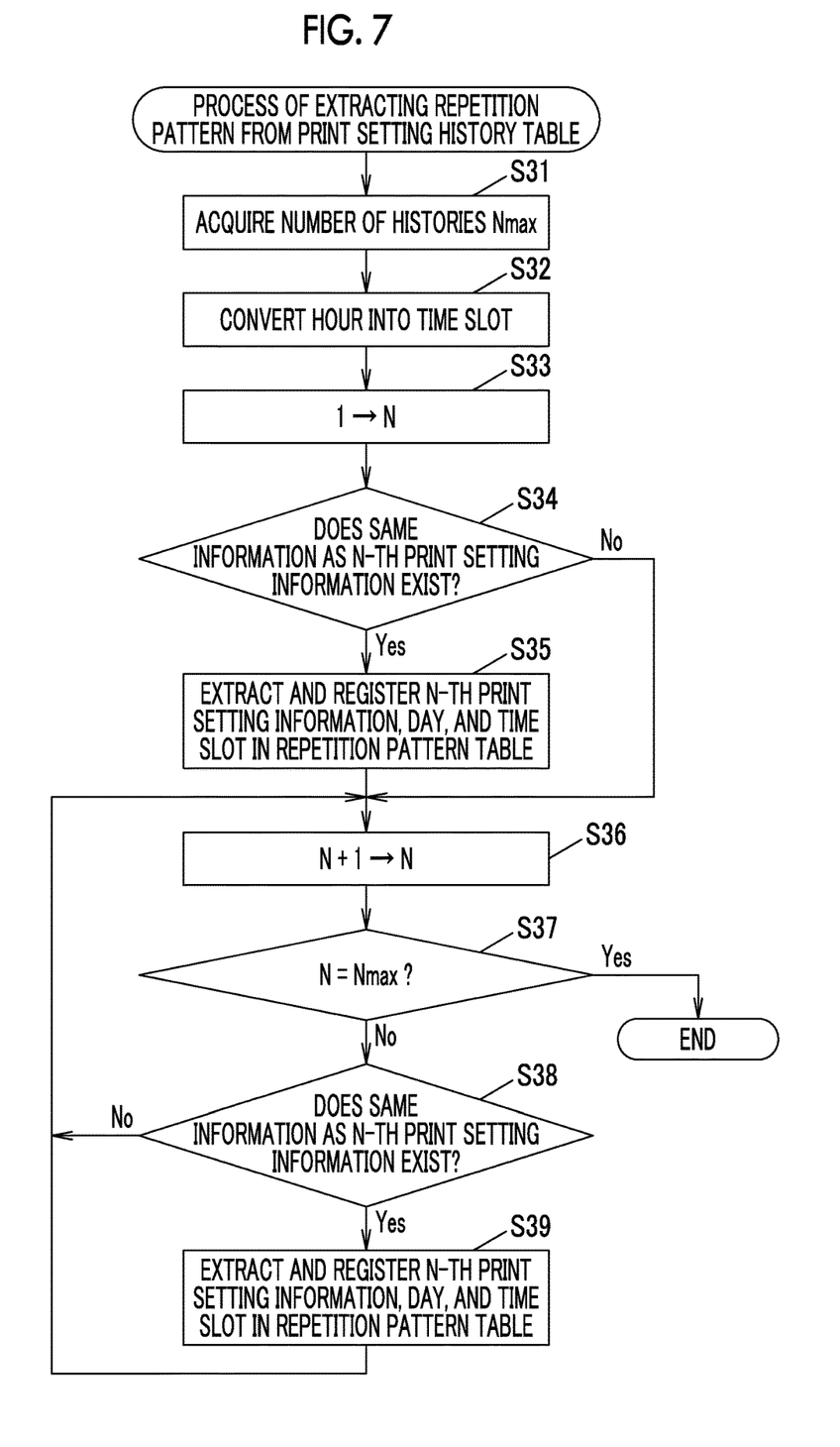
FIG. 7 is a flowchart illustrating an example of an operation of the image forming device in a case where a repetition pattern is extracted from the print setting history table.

FIG. 7 is a flowchart illustrating an example of an operation of the image forming device 1 in a case where the repetition pattern is extracted from the print setting history table 310 in response to step S3 of FIG. 6.

The repetition pattern extraction unit 21 acquires the number of histories Nmax with reference to the print setting history table 310 illustrated in FIG. 2 (S31). In the case illustrated in FIG. 2, 12 is acquired as the number of histories Nmax.

Subsequently, the repetition pattern extraction unit 21 converts the hour, which is registered in the "hour" field of the print setting history table 310 illustrated in FIG. 2, into a time slot (S32). In the case illustrated in FIG. 2, the whole time is converted into a time slot 8:00 to 10:00.

Subsequently, the repetition pattern extraction unit 21 sets N to 1 (S33), and determines whether or not information, which is the same as N(=1)-th print setting information, is registered subsequent to a next stage ((N+1)-th) (S34).

Subsequently, in a case where the same print setting information is registered (S34: Yes), the repetition pattern extraction unit 21 extracts the N(=1)-th print setting information, the day, and the time slot, and registers the extracted N(=1)-th print setting information, the day, and the time slot in the repetition pattern table 320 (S35). In the case illustrated in FIG. 2, first print setting information is the same as fifth print setting information, and thus the first print setting information, the day, and the time slot are registered in the repetition pattern table 320. In a case where the same print setting information is not registered in step S34 (S34: No), the process proceeds to step S36.

Subsequently, the repetition pattern extraction unit 21 increments N (S36), checks a fact that N does not reach Nmax (S37), and determines whether or not print setting information, which is the same as the N(=2)-th print setting information, is registered subsequent to the next stage (N+1-th) (S38).

Subsequently, in a case where the same print setting information is registered (S38: Yes), the repetition pattern extraction unit 21 registers the N(=2)-th print setting information, the day, and the time slot in the repetition pattern table 320 (S39). In the case of FIG. 2, second print setting information is the same as sixth print setting information, and thus the second print setting information, the day, and the time slot are registered in the repetition pattern table 320.

The above-described steps S36 to S39 are performed until N reaches Nmax in step S37. In step S38, in a case where the same print setting information is not registered (S38: No), the process proceeds step S36.

FIG. 4 is a diagram illustrating an example of the repetition pattern table 320 extracted by the repetition pattern extraction unit 21. The repetition pattern table 320 is provided with a "No." field, a "paper tray" field, a "printing orientation" field, a "double-sided setting" field, a "scaling" field, a "manual insertion tray paper size" field, a "day" field, a "time slot" field, and an "number of executions" field.

"No." field is registered with numbers, such as 1, 2, . . . , are registered as the pattern identification information. The meanings of the "paper tray" field, the "printing orientation" field, the "double-sided setting" field, the "scaling" field, the "manual insertion tray paper size" field, and the "day" field are the same as in FIG. 2. The "time slot" field is registered with relevant time slots from among 8:00-10:00, 10:00-12:00, 12:00-14:00, 14:00-16:00, and 16:00-18:00 which are acquired, for example, by dividing the working time (for example, 8:00 to 18:00) of the image forming device 1 into five. The "number of executions" field is registered with the number of times of repeated printing execution. In the case illustrated in FIG. 2, No. 1 of the pattern identification information is repeated three times, and thus 3 is registered in the "number of executions" field of FIG. 4.

(3) Printing of Print Data Transmitted from Basic System

Figure 8:
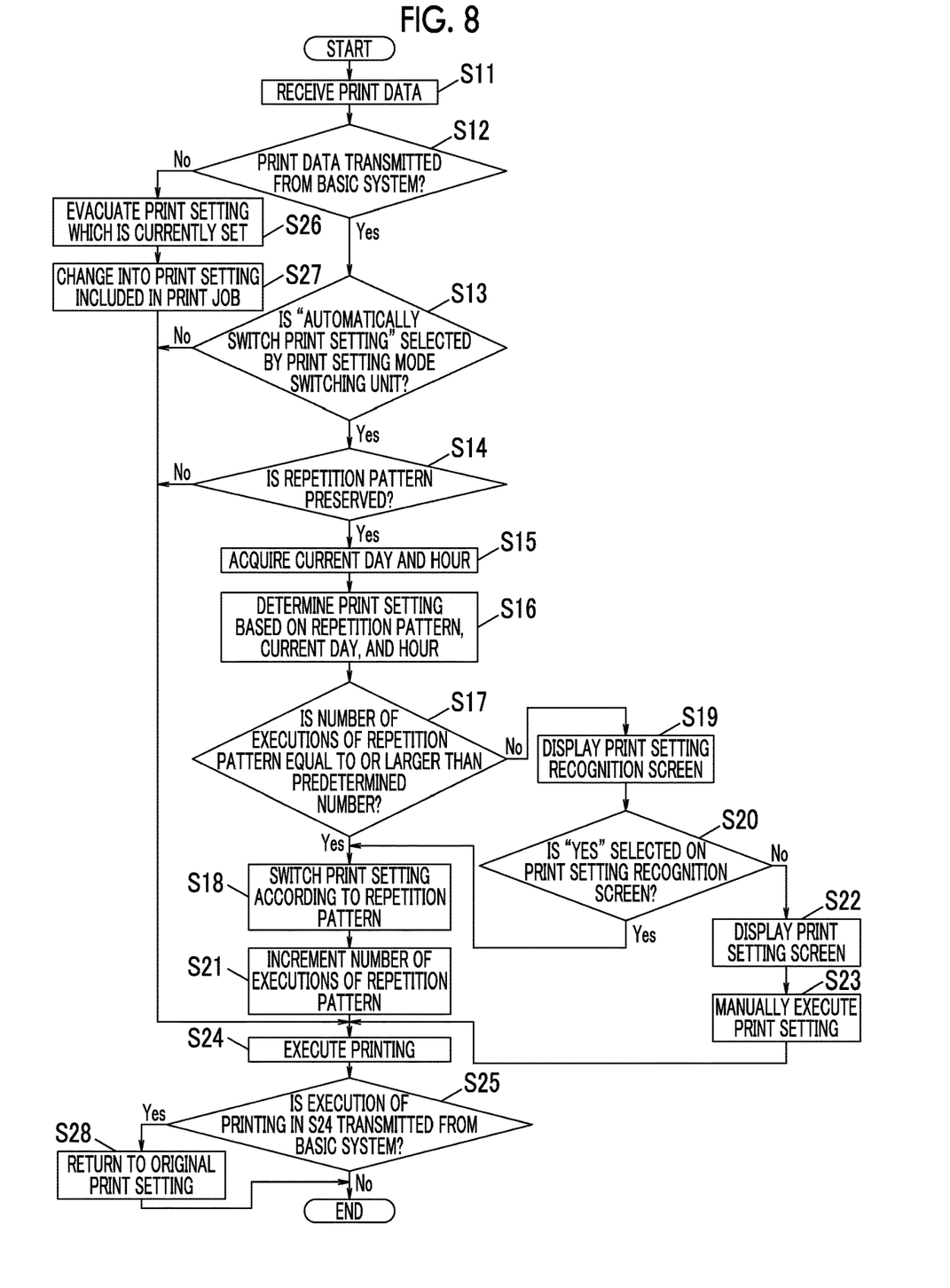
FIG. 8 is a flowchart illustrating an example of an operation of the image forming device according to the exemplary embodiment.

FIG. 8 is a flowchart illustrating an example of an operation of a process of printing the print data in the image forming device 1.

In a case where the image forming device 1 receives the print data from the basic system 9 through the network 8 and the communication unit 7 and the reception unit 20 receives the print data (S11), the decision unit 22 decides whether or not the print data received by the reception unit 20 is transmitted from the basic system 9 (S12). Specifically, the decision unit 22 decides whether or not, for example, the print data received by the reception unit 20 involves the print setting information. That is, in a case where the print data does not involve the print setting information, the decision unit 22 decides that the print data is transmitted from the basic system 9 and, in a case where the print data is a print job which involves the print setting information, the decision unit 22 decides that the print data is transmitted from the terminal device 10.

In a case where the decision unit 22 decides that the print data is transmitted from the basic system 9 (S12: Yes), the print setting unit 24 refers to the print setting mode preserved in the print setting mode preservation unit 33, and determines whether or not the print setting mode 331 to "automatically switch print setting" is selected (S13). Meanwhile, in a case where the print setting mode 331 to "automatically switch print setting" is not selected (S13: No), the print setting unit 24 executes printing according to, for example, the print setting information, which is set in the image forming device 1 in advance, without switching print setting (S24). Meanwhile, in a case where the print setting is manually switched, the user manually performs the print setting before the print data is transmitted.

In a case where the print setting mode 331 to "automatically switch print setting" is selected (S13: Yes), the current hour acquisition unit 23 refers to the repetition pattern preservation unit 32, and determines whether or not the repetition pattern is preserved (S14). Meanwhile, in a case where the repetition pattern is not preserved (S14: No), the current hour acquisition unit 23 executes printing according to, for example, the print setting information, which is set in the image forming device 1 in advance, without switching print setting.

In a case where the repetition pattern is preserved (S14: Yes), the current hour acquisition unit 23 acquires a current hour and a day, which indicate the present, from the timer (S15).

The print setting unit 24 acquires a relevant repetition pattern, and determines the print setting (S16). For example, in a case where the current hour is 9:05 and the day is month day, four print settings are determined.

The print setting unit 24 refers to the number of executions of the repetition pattern of the repetition pattern preservation unit 32. In a case where the number of executions is equal to or larger than a prescribed number (for example, two times) (S17: Yes), the print setting unit 24 cause the print setting to be automatically switched according to the repetition pattern (S18).

In a case where the pattern identification information is No. 1 in the case illustrated in FIG. 4, the print setting unit 24 preserves the pieces of print setting information 321 to 324 in the temporary preservation unit 34. The print setting unit 24 increments the "number of executions" field of the repetition pattern table 320 (S21). That is, a value of the "number of executions" field is rewritten from "3" to "4".

The printer 25 performs printing according to initial print setting information 321 among the pieces of print setting information 321 to 324 in which the pattern identification information corresponds to No. 1, switches the print setting information 321 into subsequent print setting information 322 in a case of reception of subsequent print data, and prints the print data according to the print setting information 322. As described above, printing is executed while sequentially switching the print setting information.

In a case where the number of executions is smaller than the prescribed number (S17: No), the print setting unit 24 displays a print setting recognition screen 240, which will be described later and is illustrated in FIG. 5, on the operation display 4 (S19), and causes the user to recognize whether or not to automatically switch the print setting with the repetition pattern (S20).

Figure 5:
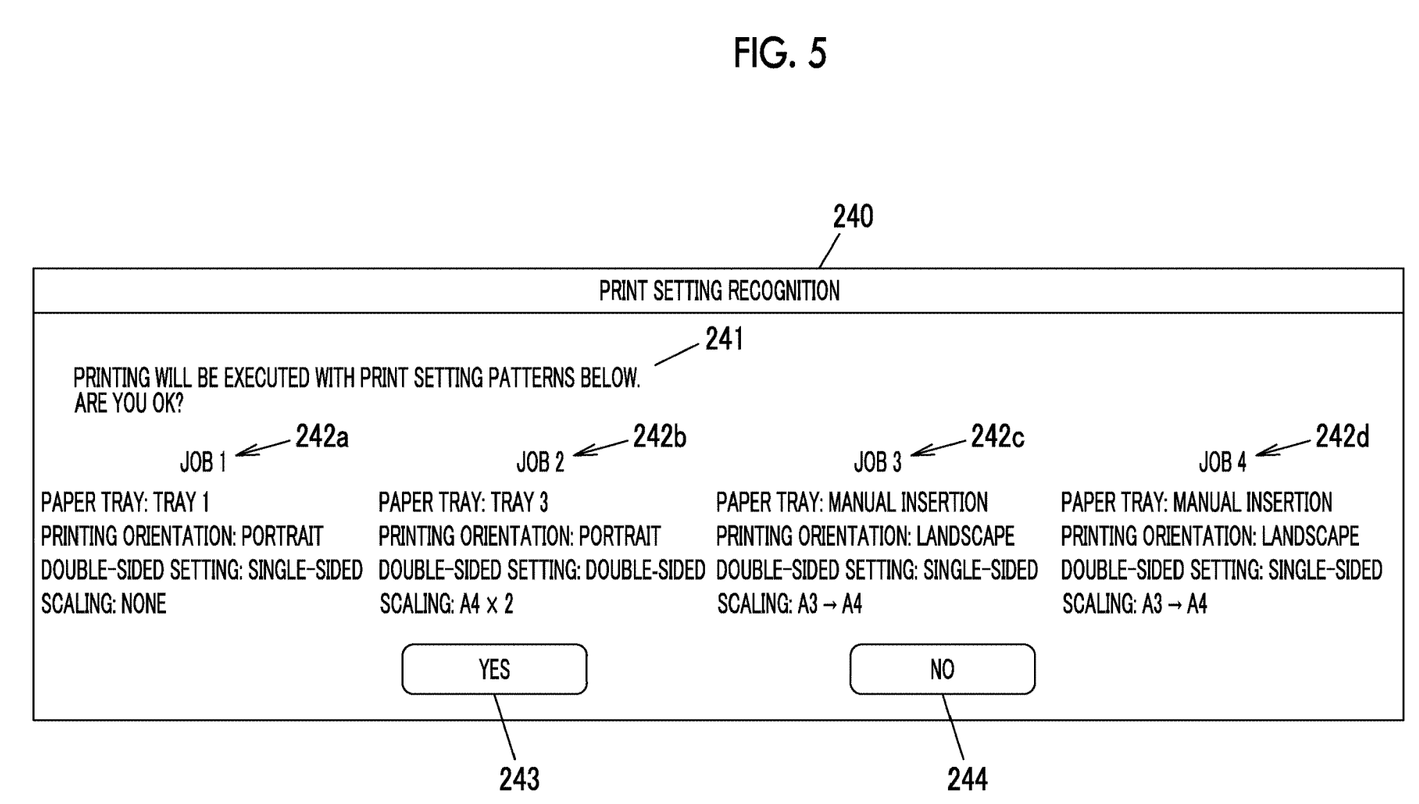
FIG. 5 is a diagram illustrating an example of a print setting recognition screen.

FIG. 5 is a diagram illustrating an example of the print setting recognition screen. In the print setting recognition screen 240, a message 241 which expresses "printing will be executed with the print setting patterns below" is displayed, and four pieces of print setting information 242a to 242d, which are expressed by job 1, job 2, job 3, and job 4 corresponding to pattern identification information No. 1, are displayed. The four pieces of print setting information 242a to 242d corresponds to four pieces of print setting information of No. 1 of FIG. 4. In addition, a "Yes" button 243 indicative of approval with respect to the message 241 and a "No" button 244 indicative of rejection with respect to the message 241 are displayed on the print setting recognition screen 240.

In a case where the "Yes" button 243 is selected on the print setting recognition screen (S20: Yes), the print setting is automatically switched according to the print pattern (S18), and the print setting unit 24 increments the number of executions of the repetition pattern preservation unit (S21). In a case where the "No" button 244 is selected (S20: No), a print setting screen (not shown in the drawing) is displayed (S22), and the user manually performs the print setting (S23). After the print setting is completed, printing is executed (S24).

Since the print data, which is printed in step S24, is data which is transmitted from the basic system 9 (S25: Yes), the print setting rewriting unit 26 causes the print setting information preserved in the temporary preservation unit 34 to remain as it is.

(4) Printing of Print Data Transmitted from Terminal Device

For example, in a case where a print job is transmitted from the terminal device 10 to the image forming device 1 through the network 8 and the communication unit 7 by interruption while printing is performed on the print data sequentially transmitted from the basic system 9, the image forming device 1 receives the print job. In a case where the reception unit 20 receives the print job (S11), the decision unit 22 decides whether or not the print data received by the reception unit 20 is transmitted from the basic system 9 (S12). In a case where the print job is received, the print data involves the print setting information, and thus the decision unit 22 decides that the print data is transmitted from the terminal device 10.

In a case where the transmitted print data is the print data transmitted from the basic system 9 in step S12, that is, in a case of the print data transmitted from the terminal device 10 (S12: No), the print setting rewriting unit 26 evacuates the print setting information which is currently preserved in the temporary preservation unit 34 to the evacuation preservation unit 35 (S26), and rewrites content preserved in the temporary preservation unit 34 into the print setting information included in the print job (S27). Meanwhile, in a case where the print setting information is rewritten, the recognition screen may be displayed in the operation display 4, and, in a case where the user gives permission with respect to the recognition screen, the print setting information may be rewritten.

The printer 25 prints the print data on the paper based on the print setting information preserved in the temporary preservation unit 34 (S24). In a case where printing corresponding to the print job is performed (S25: No), the print setting information preserved in the temporary preservation unit 34 is evacuated to the evacuation preservation unit 35. Therefore, the print setting rewriting unit 26 returns the print setting information evacuated to the evacuation preservation unit 35 to the temporary preservation unit 34 (S28).

Meanwhile, in the above exemplary embodiment, in a case where the number of executions of the repetition pattern is equal to or larger than a prescribed number, the print setting information stored in the temporary preservation unit 34 is rewritten according to the repetition pattern table 320 with respect to the print data transmitted from the basic system 9. However, in a case where the print setting information is written, the recognition screen may be displayed on the operation display 4, and the print setting information may be rewritten only in a case where the user gives permission on the recognition screen. Therefore, in a case where the transmission of the print data from the basic system 9 is delayed, the print setting information is rewritten into print setting information in a subsequent time slot, and thus it is possible to prevent the print data from being erroneously printed. In addition, it is possible to secure time in which paper is replaced in a case where the time slot is divided.

In addition, the controller 2 of the image forming device 1 may predict a fact that paper lacks in printing at a subsequent time slot based on the repetition pattern table 320 and the print setting information, and may perform display to promote replenishment of paper in a case where the recognition screen is displayed.

In a case where a configuration according to the exemplary embodiment is not provided and the print data transmitted from the basic system 9 is printed, the print setting information is not included, and thus the print setting information should be set in a side of the image forming device 1 every time. Therefore, the user has trouble with a setting work. In contrast, in many cases, a case where the print data from the basic system 9 is printed is, for example, printing closely related to a period (schedule) in which salary specifications of all employees are collectively printed in a salary payment period. In other words, the print setting information is uniquely specified with respect to the schedule. Therefore, according to the exemplary embodiment, in a case where the print data transmitted from the basic system 9 is detected and the registered print setting information has the periodicity, there is an advantage in that it is possible to perform print setting without an operation performed by the user.

Modified Example

Hereinabove, although an exemplary embodiment of the present invention is described, the exemplary embodiment of the present invention is not limited to the above-described exemplary embodiment, and various modifications and executions are possible without changing the gist of the present invention.

A part or all of the respective units of the controller may be formed by a hardware circuit such as a Field Programmable Gate Array (FPGA) or specific Application Specific Integrated Circuit (ASIC).

In addition, it is possible to omit and change a part of the components of the above-described exemplary embodiment without changing from the gist of the invention. In addition, it is possible to add, remove, change, and replace steps in the flow of the above-described exemplary embodiment without departing from the gist of the invention. In addition, it is possible to provide the program, which is used in the exemplary embodiment, by recording the program in a computer-readable recording medium such as a CD-ROM. In addition, it is possible to store the program, which is used in the above-described exemplary embodiment, in an external server, such as a cloud server, and to use the program through a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing apparatus comprising:
a memory that stores time information having a periodicity and print setting information, as a printing execution history;
a processor, configured to:
receive print data, wherein the print data does not involve print setting information;
print the print data according to the print setting information corresponding to the time information stored in the memory in a case of reception of the received print data or in a case where time in the case of printing execution corresponds to the time information, wherein the printing execution is designated with respect to the received print data;
receive another print data, wherein the another print data involves another print setting information;
evacuate the print setting information currently preserved in the memory to another memory and rewrite the another print setting information of the another print data into the memory; and
print the another print data according to the another print setting information.

2. A printing apparatus comprising:
a memory that stores time acquired in a case where printing is executed and print setting information, as history information;
a processor, configured to:
extract time information having a periodicity and print setting information from the history information, and stores the extracted pieces of information as extraction information in the memory;
receive print data, wherein the print data does not involve print setting information;
print the print data according to the print setting information corresponding to the time information stored in the memory in a case of reception of the received print data or in a case where time in the case of printing execution corresponds to the time information having the periodicity of the extraction information, wherein the printing execution is designated with respect to the received print data;
receive another print data, wherein the another print data involves another print setting information;
evacuate the print setting information currently preserved in the memory to another memory and rewrite the another print setting information of the another print data into the memory; and
print the another print data according to the another print setting information.

3. The printing apparatus according to claim 2, wherein the time information having the periodicity is acquired by performing conversion on a unit of time of the history information.

4. The printing apparatus according to claim 3, wherein the time of the history information includes hour, and
wherein the time information having the periodicity is acquired by converting the hour into a time slot.

5. The printing apparatus according to claim 4, wherein the time slot includes two or more types of time slots.

6. The printing apparatus according to claim 3, wherein the time of the history information includes a date, and
wherein the time information having the periodicity is acquired by converting the date into a day.

7. The printing apparatus according to claim 3, wherein the time of the history information includes an hour and a date, and
wherein the time information having the periodicity is acquired by converting the hour into a time slot and converting a date into the day.

8. The printing apparatus according to claim 7, wherein the time slot includes two or more types of time slots.

9. The printing apparatus according to claim 3, wherein the time of the history information includes an hour and a day, and
wherein the time information having the periodicity includes a time slot and the day acquired by converting the hour into the time slot.

10. The printing apparatus according to claim 9, wherein the time slot includes two or more types of time slots.

11. The printing apparatus according to claim 3, wherein the processor extracts a plurality of pieces of print setting information, in which the time of the history information is consecutive.

12. The printing apparatus according to claim 2, wherein the processor determines that the print data is transmitted from a basic system, and the processor determines that the another print data is transmitted from a terminal device.

13. The print apparatus according to claim 2, wherein after the processor prints the another print data, the processor further returns the print setting information preserved in the another memory back to the memory.

14. The print apparatus according to claim 2, wherein when the processor receives the print data, the processor further acquires a relevant repetition pattern corresponding to current time information, determines whether the number of executions of the relevant repetition pattern is equal to or larger than a predetermined number, switches the print setting information according to the relevant repetition pattern in response to the number of executions of the relevant repetition pattern being equal to or larger than the predetermined number, increments the number of the executions of the relevant repetition pattern, and prints the print data.

15. The print apparatus according to claim 14, wherein the processor further displays the relevant repetition pattern on a print setting screen in response to the number of executions of the relevant repetition pattern being less than the predetermined number.

16. A non-transitory computer readable medium storing a program which causes a computer to:
  receive print data, wherein the print data does not involve print setting information;
  print the print data according to the print setting information corresponding to the time information stored in a memory in a case of reception of the received print data or in a case where time in the case of printing execution corresponds to the time information having a periodicity and indicating printing execution time stored with the print setting information, wherein the printing execution is designated with respect to the receive print data;
  receive another print data, wherein the another print data involves another print setting information;
  evacuate the print setting information currently preserved in the memory to another memory and rewrite the another print setting information of the another print data into the memory; and
  print the another print data according to the another print setting information.

* * * * *